Nov. 17, 1964  R. N. PALMER  3,157,557
PLASTIC SOD
Filed April 6, 1961

INVENTOR.
RICHARD NEAL PALMER
BY
*James b. Tyler*
ATTORNEY

United States Patent Office 3,157,557
Patented Nov. 17, 1964

3,157,557
PLASTIC SOD
Richard Neal Palmer, West Hollywood, Fla.
(Star Rte., Ravena, N.Y.)
Filed Apr. 6, 1961, Ser. No. 101,169
1 Claim. (Cl. 161—19)

This invention relates to artificial grass in sod form, to be formed of a suitable plastic material whereby the sod can be molded in various lengths and widths convenient for a property owner to substitute the plastic sod for the present natural grass.

Extreme difficulty and cost of maintenance is prevalent in this area since natural grasses are attacked by insects, such as the army worm and chinch bugs, requiring expensive sprays and in addition, requiring frequent applications of plant food and water. The plastic sod of this invention is preferably formed by injecting molding of a thermoplastic that is impervious to temperature changes thus, permitting its use also in northern climates.

It is contemplated that the sod shell have a base portion and a multiplicity of upstanding slender strands corresponding generally to the width and length of the recognized lawn grasses and that the plastic shell be colored to simulate natural grass or may be formed in other colors for decorative purposes.

Referring specifically to the drawings wherein has been illustrated a preferred form of sod and, wherein like characters of reference are employed to denote like parts throughout the several figures.

Figure 1:
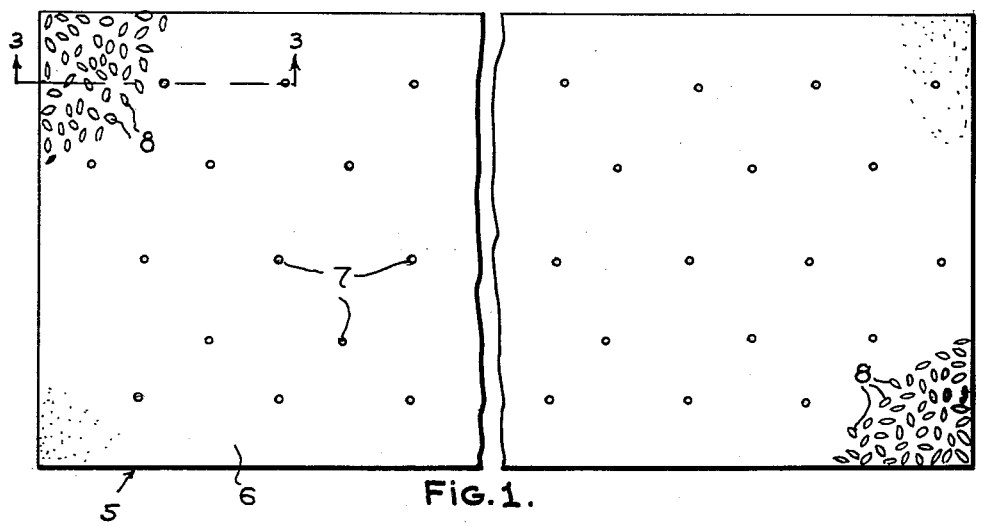
Figure 2:
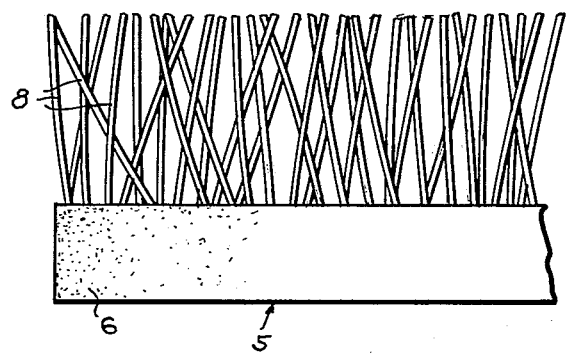
Figure 3:
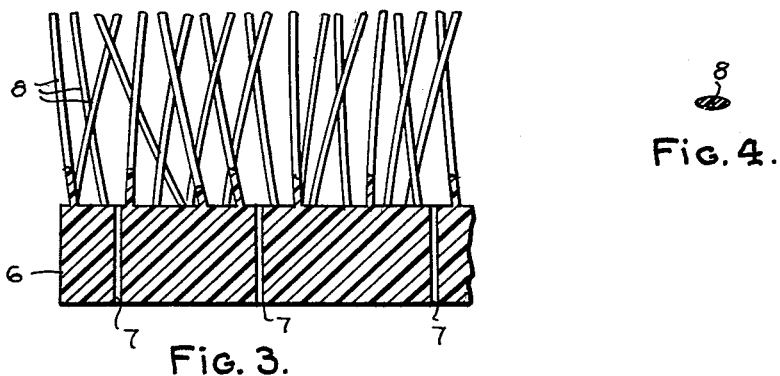
Figure 4:

In the drawings:
FIGURE 1 is a plan view of a section of sod constructed in accordance with the invention,
FIGURE 2 is an enlarged fragmentary edge view thereof,
FIGURE 3 is a fragmentary section taken substantially on line 3—3 of FIGURE 1, and
FIGURE 4 is a transverse section taken through any one of the blades of simulated grass.

Referring specifically to the drawings, the numeral 5 designates a strip of sod having various dimensions, such as 2 feet by 4 feet, such a size being convenient for handling the sod and installing it upon a ground surface. While the sod has been indicated as being in a dimension of two feet by four feet, it will be apparent that the sod may be molded in relatively long strips to be rolled upon itself so that the strips may be conveniently handled and unrolled in a selected area.

The sod embodies a base section 6 of thermo-plastic material and with the base section 6 having a plurality of drain openings 7. The base 6 is provided with a multiplicity of slender stem portions 8, corresponding to the natural grass and with the stems being molded integral with the upper surface of the base 6 in slightly spaced apart relation and having a longitudinal curvature similar to the natural grass leaf. Each of the stems 8, see FIGURE 4, may be formed oval in cross section and it is contemplated that the stems 8 have a length of from one to one and one-half inches, being the recognized length of the grass that has been mowed. The base 6 and the stems 8 are preferably molded in a conventional manner and in such dimensions that it is convenient for handling, may be readily cut to engage the edge of a sidewalk or the like.

In the use of the device, a multiplicity of sod sections 5 are selected and the ground prepared by removing all of the natural grasses and then to preferably spreading a light covering of sand or the like upon the ground after which the sod strips 5 are laid in end to end and side to side relation. After the sod has been laid it may be found desirable to sprinkle a light coating of sand over the sod with just enough of the sand to cover the surface of the base 6. The stem 8 obviously will be flexible, permitting persons to walk thereover without damaging the grass and the grass stems 8 will spring back to their normal upstanding position. The drainage openings 7 permit ready drainage due to rainfall and when employed in the north, the snow will melt and also drain through the openings 7 and the joints between the sections of sod.

It will be apparent from the foregoing that a very novel form of artificial sod has been provided. The sod is molded in a conventional plastic mold and is relatively cheap to manufacture and install and gives the appearance of a natural grass that requires no maintenance. The coloring of the sod is relatively permanent and the forming of the sod in strips to predetermined sizes allow for cross-laying and also ease in handling and shipping and greatly reduces the cost of maintaining a natural grass lawn and the inclination of the grass stems 8 give the appearance of a natural grass lawn.

It is to be understood that the invention is not limited to the precise construction shown, but that changes are contemplated as readily fall within the spirit of the invention as shall be determined by the scope of the subjoined claim.

Having described my invention what I claim as new and desire to secure by Letters Patent is:

An integrally molded plastic sod of the character described to simulate natural grass comprising an elongated rectangular flat and relatively flexible base of relatively thick plastic material having a multiplicity of relatively closely arranged flexible leaf or blade-like plastic stems molded integral with the base and with the stems being promiscuously arranged and interlaced to simulate natural grass and with the stems having a natural inclination corresponding to natural grass, the stems being spaced apart substantially an equal distance over the entire surface of the base and normally biased to the upstanding position, the stems being slightly arcuate transversely throughout their length corresponding to natural grass leaves, the said base being provided with a multiplicity of drain openings in spaced apart predetermined relation with respect to the area of the base.

References Cited by the Examiner

UNITED STATES PATENTS

| 850,396 | 4/07 | Polt | 15—161 |
|---|---|---|---|
| 1,377,934 | 5/21 | Silas | 15—161 |
| 1,438,720 | 12/22 | Poppenhusen et al. | 15—161 |
| 1,929,366 | 10/33 | McClintock | 161—25 |
| 1,961,139 | 6/34 | Elder | 27—29 |
| 2,015,889 | 10/35 | Fineman | 27—30 |
| 2,070,825 | 2/37 | Buhrow | 41—15 |
| 2,232,647 | 2/41 | Zirkman | 27—30 |
| 2,248,811 | 7/41 | Cotterman | 264—243 X |
| 2,645,804 | 7/53 | Gantz et al. | 15—187 |
| 2,734,297 | 2/56 | Dunklee. | |
| 2,737,746 | 4/56 | Orr | 161—27 |
| 2,837,855 | 6/58 | Hoke | 41—12 |

FOREIGN PATENTS

| 1,224,063 | 2/60 | France. |
|---|---|---|

EARL M. BERGERT, Primary Examiner.
HAROLD ANSHER, CARL F. KRAFFT, Examiners.